Jan. 11, 1966  D. GAUKEL  3,228,576
LUGGAGE CARRIER
Filed March 13, 1964

DENNIS GAUKEL
*INVENTOR.*

BY
HIS ATT'Y

United States Patent Office 3,228,576
Patented Jan. 11, 1966

3,228,576
LUGGAGE CARRIER
Dennis Gaukel, Onawa, Iowa
Filed Mar. 13, 1964, Ser. No. 351,628
5 Claims. (Cl. 224—42.03)

This invention pertains to luggage carriers and more particularly to a luggage carrier adapted to be mounted as an auxiliary on the rear end of an automobile.

Many compact automobiles, and particularly small foreign built cars, have a severe shortage of luggage space, when used as a family car. This can be alleviated to some extent by top carriers or the like, but these are often much less convenient than would be a carrier at a lower level. Permanently attached carriers have also been tried, but such carriers break the smooth lines of the automobile even when there is no particular use for the carrier.

By my invention I provide a luggage carrier, easily mounted and easily removable, for a small foreign car which can be used to increase the luggage carrying capacity substantially when needed and be easily removed when not needed.

Figure 1:
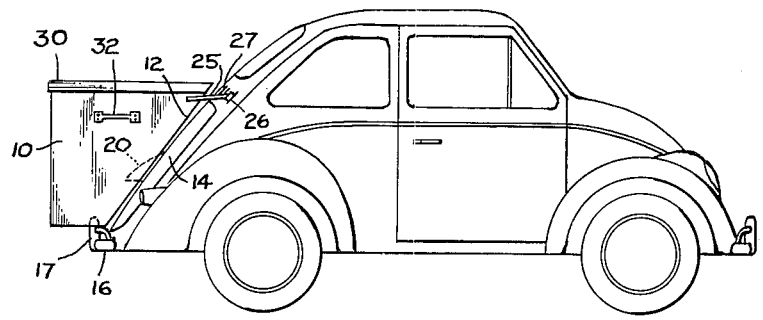
Figure 2:
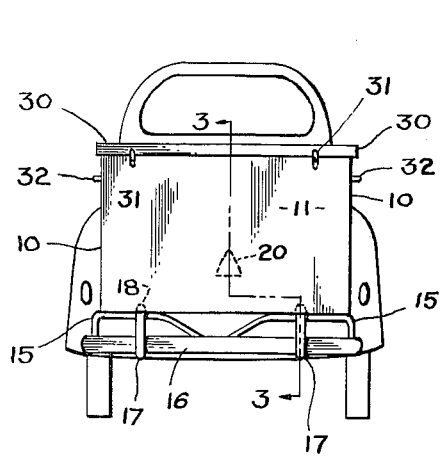
Figure 3:
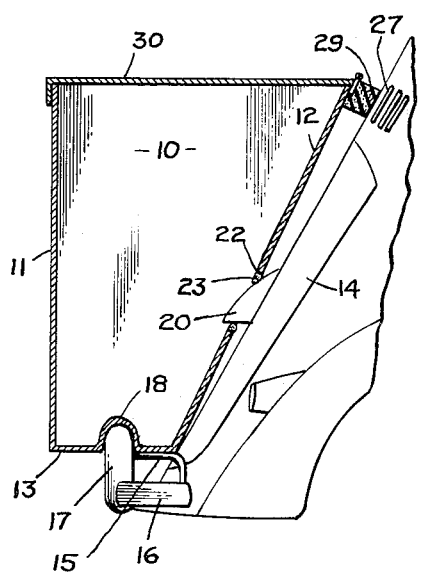

A more complete understanding of my invention in its embodiment may be gained from a study of the following specification and the figures in which:

FIG. 1 is a side elevational view of my luggage carrier as mounted on the automobile, FIG. 2 is a rear elevational view thereof, and FIG. 3 is a sectional view along line 3—3 of FIG. 1.

Briefly my invention comprises a luggage carrier including a container adapted to rest on the bumper of a compact automobile, be held to the car by easily released catches and having a unique means for holding the container in place by utilizing the conformation and protuberances on the car.

More specifically, and referring to the drawings, my device comprises a container having side walls 10, a rear wall 11, a front wall 12 and a bottom 13. For the sake of this description, I have shown and will describe my invention as it might be used with a Volkswagen car, and while the invention is peculiarly well adapted to such a car, it may be modified and used with other compact cars where the luggage carrying capacity is small.

When used with a Volkswagen car, the front or forward wall 12 is sloped to the approximate slant of the rear deck 14 of the car. The bottom is adapted to rest on horizontal bumper guards 15 on the rear bumper 16 of the car. The bottom may be perforated, or is preferably dimpled as at 18 to provide a socket in which the upper end of the vertical bumper guards 17 may fit. This provides more bearing for the bottom on the horizontal guard so that the weight of the luggage will be better supported, and will further provide restraint for the container against either lateral or longitudinal horizontal movement of the bottom. If the bottom is to be perforated to make openings into which the vertical guards 17 will protrude, it might be necessary to provide a gasket or seal of soft rubber or the like to prevent entry of water and dust into the container at these openings.

In order to prevent vertical movement of the container, I also utilize the conformation of the car. On most compacts of foreign make, a light 20 or similar protuberance is present on the rear deck of the car. On the Volkswagen, in particular, a light having a substantially flat lower surface is located nearly in the center of the rear deck 14. By forming an opening 22 or a dimple in the forward wall 12, and by providing a substantially flat lower surface in the opening or dimple to engage the lower surface of the light, I can provide for retaining the container from upward movement. Again, if an opening is used, a seal 23 of soft rubber, or similar material must be used to prevent entry of dust or moisture.

Motion longitudinally of the car at the upper part of the container is prevented by the use of straps 25 or the like fixed to the container ond having hooks 26 adapted to engage the car at a convenient place. On the Volkswagen, these hooks may be inserted into the cooling grille 27 which is formed on the upper part of the rear deck. On cars in which such a grille is not available, the hooks may engage the edges of the rear windows or the like. In any event, the straps may be pulled tight by means of a common buckle or may have more elaborate spring-loaded buckles for more rapid attachment or release. A padded bumper 29 is provided on the forward wall 12 of the container to rest on the rear deck 14 to prevent scratching because of metal to metal contact.

In order to complete the device, I provide a cover 30 which may be hinged to the forward wall and be fastened shut with any convenient type of latch 31. Again, proper precautions and seals must be used to keep out moisture and dust. Handles 32 may also be provided on the side walls 10 to allow easy handling on the container.

In use, the container may be loaded either before or after mounting. To mount the device, it is simply lifted up till the sockets in the bottom are in place over the bumper guards 27, and then lowered onto them till the bottom rests on the horizontal guards 15. The container will normally be sloped somewhat to the rear in this maneuver. It is then tilted forward till the light 20 is embraced by the opening 22 or dimple, and the padded bumper 29 is against the rear deck 14. At this time, the hooks 26 are engaged, the straps pulled tight and the device is completely mounted. Dismounting is accomplished by a simple reversal of the above procedure. It might be further noted that the carrier can be dismounted with out unpacking it so that the unpacking can be done while the carrier is on the ground. In that position bags and the like need not be lifted very high to removed from the carrier.

Having thus described my invention in its embodiment I am aware that further and extensive variations may be made therefrom without departing from the spirit and scope of my invention as limited only by the following claims:

I claim:

1. For use with an automobile having a rear deck including a protuberance thereon and a rear bumper with vertical guards thereon, a container having a bottom, two side walls, a forward wall and a rear wall, said bottom being formed with dimpled means adapted to engage said vertical guards to prevent horizontal motion of said container, said forward wall being formed with an aperture adapted to engage said protuberance to prevent vertical motion of said container, and strap means releasably engaged between said container and said automobile to provide ready mounting and dismounting of said container.

2. For use with an automobile having a rear deck, ventilating grille means in said rear deck, a protuberance extending from said rear deck, and a rear bumper having vertically extending bumper guards; a luggage carrier comprising a container, said container being formed with two side walls, a forward wall, a rear wall and a bottom, said bottom being formed to provide dimpled areas adapted to engage said bumper guards, said forward wall being formed to provide a protuberance engaging recess adapted to fit over said protuberance, strap means on said container releasably engageable with said ventilating grille whereby said container may be readily held in place.

3. For use with an automobile having a rear deck, ventilating grille means in said rear deck and a protuberance extending from said rear deck, and a rear bumper having vertically extending bumper guards, a luggage carrier comprising a container, said container being formed with two side walls, a forward wall, a rear wall and a bottom, said bottom being formed to provide dimpled areas adapted to engage said bumper guards, said forward wall being formed to provide a protuberance engaging recess adapted to fit over said protuberance, strap means on said container releasably engageable with said ventilating grille whereby said container may be readily held in place, and a handle on each of said side walls for ease in handling said container.

4. The device of claim 2 in which the protuberance-engaging recess is a dimple formed in the forward wall.

5. The device of claim 2 in which the protuberance-engaging recess is an opening formed in the forward wall, gasket means surrounding said opening to seal it to said protuberance.

References Cited by the Examiner
UNITED STATES PATENTS
2,409,103  10/1946  Cameron _____ 224—42.03

FOREIGN PATENTS
701,997  1/1931  France.
308,215  6/1955  Switzerland.

GERALD M. FORLENZA, *Primary Examiner.*
HUGO O. SCHULZ, *Examiner.*